(12) United States Patent
Max et al.

(10) Patent No.: US 6,969,467 B1
(45) Date of Patent: Nov. 29, 2005

(54) HYDRATE-BASED DESALINATION WITH HYDRATE-ELEVATING DENSITY-DRIVEN CIRCULATION

(75) Inventors: Michael D. Max, Washington, DC (US); Jens Korsgaard, Newark, NJ (US)

(73) Assignee: Marine Desalination Systems, L.L.C., Washington, DC (US)

(*) Notice: Subject to any disclaimer, the term of this patent is extended or adjusted under 35 U.S.C. 154(b) by 90 days.

(21) Appl. No.: 10/656,339

(22) Filed: Sep. 8, 2003

Related U.S. Application Data

(60) Continuation-in-part of application No. 10/402,940, filed on Apr. 1, 2003, and a continuation-in-part of application No. 10/266,258, filed on Oct. 8, 2002, now Pat. No. 6,733,667, and a continuation-in-part of application No. 09/987,725, filed on Nov. 15, 2001, now Pat. No. 6,673,249, and a continuation-in-part of application No. 09/491,545, filed on Aug. 30, 2001, now Pat. No. 6,767,471, which is a division of application No. 09/397,500, filed on Sep. 17, 1999, now Pat. No. 6,497,794, which is a continuation-in-part of application No. 09/375,410, filed on Aug. 17, 1999, now Pat. No. 6,531,034, which is a continuation-in-part of application No. 09/350,906, filed on Jul. 12, 1999, now Pat. No. 6,565,715.

(60) Provisional application No. 60/240,986, filed on Oct. 18, 2000, provisional application No. 60/230,790, filed on Sep. 7, 2000.

(51) Int. Cl.[7] ............................................. C02F 1/00
(52) U.S. Cl. ..................... 210/712; 62/532; 203/10; 210/718; 210/726; 210/737; 210/747; 210/774; 585/15

(58) Field of Search ...................... 62/532, 533, 238.5; 203/10, 100; 210/702, 712, 726, 718, 737, 210/747, 749, 750, 765, 766, 774; 585/15

(56) References Cited

U.S. PATENT DOCUMENTS

| 135,001 A | 1/1873 | Meylert |
| 2,904,511 A | 9/1959 | Donath |
| 2,974,102 A | 3/1961 | Williams |

(Continued)

FOREIGN PATENT DOCUMENTS

GB        1 320 134        6/1973

(Continued)

OTHER PUBLICATIONS

EPO—Patent Abstracts of Japan, Publication No. 61136481, Publication Jun. 24, 1986, Muneschichi, Concentration of Aqueous Solution English langauge abstract.

(Continued)

*Primary Examiner*—Peter A. Hruskoci
(74) *Attorney, Agent, or Firm*—Kenneth M. Fagin, Esq.

(57) ABSTRACT

In hydrate-based desalination or other water purification conducted using naturally buoyant or trapped-gas-assisted buoyancy hydrate in a hydrate fractionation column, a portion of fresh or purified product water is extracted from an upper, hydrate dissociation region of the fractionation column and reintroduced into a lower portion of the fractionation column at a point above but generally near a product water/saline water interface. The difference in density between the reintroduced product water and the fluid in the hydrate fractionation column above the point of reintroduction (water, hydrate, and gas) drives a natural circulation system which enhances the rate at which hydrate rises into the hydrate dissociation region.

23 Claims, 10 Drawing Sheets

U.S. PATENT DOCUMENTS

| | | | |
|---|---|---|---|
| 3,027,320 A | 3/1962 | Buchanan | |
| 3,119,771 A | 1/1964 | Cottle | |
| 3,119,772 A | 1/1964 | Hess et al. | |
| 3,126,334 A | 3/1964 | Harlow | |
| 3,132,096 A | 5/1964 | Walton | |
| 3,148,143 A | 9/1964 | Donath | |
| 3,155,610 A | 11/1964 | Williams | |
| 3,171,727 A | 3/1965 | Brown et al. | |
| 3,214,371 A | 10/1965 | Tuwiner | |
| 3,217,505 A | 11/1965 | Tuwiner | |
| 3,243,966 A | 4/1966 | Glew | |
| 3,308,063 A | 3/1967 | Hess et al. | |
| 3,350,299 A | 10/1967 | Hess et al. | |
| 3,350,300 A | 10/1967 | Hess et al. | |
| 3,371,035 A | 2/1968 | Jacobs et al. | |
| 3,675,436 A | 7/1972 | Ganiaris | |
| 3,712,075 A | 1/1973 | Smith et al. | |
| 3,813,892 A | 6/1974 | Johnson | |
| 3,856,492 A | 12/1974 | Klass | |
| 3,892,103 A | 7/1975 | Antonelli | |
| 3,983,032 A | 9/1976 | Hess et al. | |
| 3,992,170 A | 11/1976 | Karnofsky | |
| 4,170,328 A | 10/1979 | Kirk et al. | |
| 4,207,351 A | 6/1980 | Davies | |
| 4,267,022 A | 5/1981 | Pitcher | 203/100 |
| 4,272,383 A | 6/1981 | McGrew | |
| 4,278,645 A | 7/1981 | Filss | |
| 4,376,462 A | 3/1983 | Elliott et al. | 166/267 |
| 4,392,959 A | 7/1983 | Coillet | |
| 4,424,858 A | 1/1984 | Elliott et al. | 166/52 |
| 4,643,832 A | 2/1987 | Iniotakis et al. | |
| 4,652,375 A | 3/1987 | Heilweil et al. | |
| 4,670,159 A | 6/1987 | Garrett et al. | |
| 4,678,583 A | 7/1987 | Willson, III et al. | |
| 4,686,833 A | 8/1987 | Hino et al. | |
| 4,696,338 A | 9/1987 | Jensen et al. | |
| 4,718,242 A | 1/1988 | Yamauchi et al. | |
| 4,767,527 A | 8/1988 | Iniotakis et al. | |
| 4,821,794 A | 4/1989 | Tsai et al. | |
| 5,037,555 A | 8/1991 | Pasternak et al. | |
| 5,055,178 A | 10/1991 | Sugier et al. | |
| 5,076,934 A | 12/1991 | Fenton | |
| 5,110,479 A | 5/1992 | Frommer et al. | |
| 5,128,042 A | 7/1992 | Fenton | |
| 5,159,971 A | 11/1992 | Li | |
| 5,167,838 A | 12/1992 | Wilensky | |
| 5,304,356 A | 4/1994 | Iijima et al. | |
| 5,362,467 A | 11/1994 | Sakai et al. | |
| 5,364,611 A | 11/1994 | Iijima et al. | |
| 5,397,553 A | 3/1995 | Spencer et al. | |
| 5,444,986 A | 8/1995 | Hino | |
| 5,448,892 A | 9/1995 | Cheng | |
| 5,473,904 A | 12/1995 | Guo et al. | |
| 5,497,630 A | 3/1996 | Stein et al. | |
| 5,512,176 A | 4/1996 | Blair | |
| 5,553,456 A | 9/1996 | McCormack | |
| 5,562,891 A | 10/1996 | Spencer et al. | |
| 5,660,603 A | 8/1997 | Elliot et al. | |
| 5,679,254 A | 10/1997 | Chakrabarti | |
| 5,816,057 A | 10/1998 | Dickey et al. | |
| 5,873,262 A | 2/1999 | Max et al. | |
| 6,028,234 A | 2/2000 | Heinemann et al. | |
| 6,089,022 A | 7/2000 | Zednik et al. | |
| 6,106,595 A | 8/2000 | Spencer | |
| 6,112,528 A | 9/2000 | Rigby | |
| 6,158,239 A | 12/2000 | Max et al. | |
| 6,180,843 B1 | 1/2001 | Heinemann et al. | |
| 6,245,955 B1 | 6/2001 | Smith | |
| 6,296,060 B1 | 10/2001 | McCaslin | |
| 6,497,794 B1 * | 12/2002 | Max | 203/10 |
| 6,531,034 B1 * | 3/2003 | Max | 203/10 |
| 6,562,234 B2 * | 5/2003 | Max | 210/170 |
| 6,565,715 B1 * | 5/2003 | Max | 203/10 |
| 6,673,249 B2 * | 1/2004 | Max | 210/747 |
| 6,733,667 B2 * | 5/2004 | Max | 210/177 |
| 6,767,471 B2 * | 7/2004 | Max | 210/702 |
| 6,830,682 B2 * | 12/2004 | Max | 210/170 |
| 2002/0003111 A1 * | 1/2002 | Max | 210/703 |

FOREIGN PATENT DOCUMENTS

| | | |
|---|---|---|
| JP | 55055125 | 4/1980 |
| JP | 58109179 | 6/1983 |
| JP | 59029078 | 2/1984 |
| JP | 61025682 | 2/1986 |
| JP | 11319805 | 11/1999 |
| JP | 2000202444 | 7/2000 |
| RU | SU997715 | 2/1983 |
| RU | SU1006378 | 3/1983 |
| WO | WO 01/04056 | 1/2001 |
| WO | WO01/342667 A1 | 5/2001 |

OTHER PUBLICATIONS

Japanese Abstract, Journal No.: G0941AAK ISSN No: 0453-0683, 1995, vol. 42, No. 7. Accession No.: 95A0492545, File segment: JICST-E.

Max and Chandra, "The Dynamic Oceanic Hydrate System: Production Constraints and Strategies," Offshore Technology Conference, Paper No. 8684, pp. 1-10 (1998).

Max and Dillon, "Oceanic Methane Hydrate: The Character of the Blake Ridge Hydrate Stability Zone, and the Potential for Methane Extraction," *Journal of Petroleum Geology*, vol. 21(3), Jul. 1998, pp. 343-357.

Max, M.D., "Oceanic Methane Hydrate: The Character of the Blake Ridge Hydrate Stability Zone, and the Potential for Methane Extraction," Author's correction, *Journal of Petroleum Geology*, vol. 22(2), pp. 227-228 (Apr. 1999).

Max and Lowrie "Oceanic Methane Hydrate Development: Reservoir Character and Extraction," *Naval Research Laboratory* (NRL), OTC 8300, pp. 235-240.

Max and Lowrie, "Oceanic Methane Hydrates; A "Frontier" Gas Resource", *Journal of Petroleum Geology*, vol. 19(a), pp. 41-56 (Jan. 1996).

Max et al., "Extraction of Methane from Oceanic Hydrate System Deposits", Offshore Technology Conference, Paper No. 10727, pp. 1-8 (1999).

Max et al., "Methane-Hydrate, A Special Clathrate: Its Attributes and Potential," *Naval Research Laboratory*, NRL/MR/6101-97-7926, pp. 1-74 (Feb. 28, 1997).

Mel'nlkov et al. Russian Abstract Publication No. 2166348, May 10, 2001.

Rautenbach et al., Entwicklung und Optimierung eines Hydrat-Verfahrens zur Meerwasserentsalzung, Chemie-Ing.-Techn 45 jahrg. 1973/Nr. 5, pp. 259-254.

Seliber, Methane Cooled Desalination Method and Apparatus, USPTO, Defensive Publication T939, 007—Published Oct. 7, 1975.

XP-00213497 SU1328298 English language abstract.

\* cited by examiner

HYDRATE-BASED DESALINATION WITH HYDRATE-ELEVATING DENSITY-DRIVEN CIRCULATION

CROSS-REFERENCE TO RELATED APPLICATIONS

This application is a continuation-in-part of U.S. patent application Ser. No. 10/266,258 filed Oct. 8, 2002, (now issued as U.S. Pat. No. 6,733,667 May 11, 2004), which is a divisional of U.S. patent application Ser. No. 09/397,500 filed Sep. 17, 1999 (now issued as U.S. Pat. No. 6,497,794 on Dec. 24, 2002), which is a continuation-in-part of U.S. patent application Ser. No. 09/375,410 filed Aug. 17, 1999 (now issued as U.S. Pat. No. 6,531,034 on Mar. 11, 2003), which is a continuation-in-part of U.S. patent application Ser. No. 09/350,906 filed on Jul. 12, 1999 (now issued as U.S. Pat. No. 6,565,715 on May 20, 2003), the entire contents of all four of which are incorporated by reference. Priority is claimed from each of those four applications.

This application is also a continuation-in-part of U.S. patent application Ser. No. 09/941,545 filed Aug. 30, 2001, (now U.S. Pat. No. 6,767,471 on Jul. 27, 2004), which is based on now-expired provisional U.S. Patent Application Ser. Nos. 60/230,790 filed Sep. 7, 2000 and 60/240,986 filed Oct. 18, 2000, the entire contents of all three of which are incorporated by reference. Priority is also claimed from each of those three applications.

This application is also a continuation-in-part of U.S. patent application Ser. No. 09/987,725 filed Nov. 15, 2001, (now U.S. Pat. No. 6,673,249 on Jan. 6, 2004), the contents of which are incorporated by reference. Priority is also claimed from that application.

Finally, this application is also a continuation-in-part of co-pending U.S. patent application Ser. No. 10/402,940 filed Apr. 1, 2003, the contents of which are incorporated by reference. Priority is also claimed from that application.

STATEMENT REGARDING FEDERALLY SPONSORED RESEARCH AND DEVELOPMENT

This invention was made with Government Support under Contract Number NBCHC010003 dated Jan. 29, 2001 and issued by the Department of the Interior-National Business Center (DARPA). The Government has certain rights in the invention.

FIELD OF THE INVENTION

The invention relates to desalination or other purification of water using hydrates to extract fresh water from saline or polluted water.

BACKGROUND OF THE INVENTION

In general, desalination and purification of saline or polluted water using buoyant gas hydrates is known in the art. According to this approach to water desalination or purification, a gas or mixture of gases which spontaneously forms buoyant gas hydrate when mixed with water at sufficiently high depth-induced pressures and/or sufficiently low temperatures is mixed with water to be treated at the relatively deep base of a treatment column. Because the hydrate is positively buoyant, it rises though the column into warmer water and lower pressures. As the hydrate rises, it becomes unstable and disassociates into pure water and the hydrate-forming gas or gas mixture. The purified water is then extracted and the gas is processed and reused for subsequent cycles of hydrate formation. Suitable gases include, among others, methane, ethane, propane, butane, and mixtures thereof.

According to the series of prior patents and applications referenced above to which this application is related, hydrate-based desalination may be conducted in a hydrate fractionation shaft or column constructed in land, the depth of the column being sufficient for the weight of the water at the base of the column to generate the requisite hydrate-forming pressure. Alternatively, hydrate-based desalination may be conducted in a shaft located in an open-ocean environment, as is disclosed, for example, in U.S. Pat. Nos. 3,027,320 and 5,873,262. The present invention may be employed in connection with either in-land-shaft-based desalination (or other water purification) or open ocean-based desalination (or other purification).

BRIEF SUMMARY OF THE INVENTION

According to the invention, in hydrate-based desalination or other water purification conducted using naturally buoyant or trapped-gas-assisted buoyancy hydrate in a hydrate fractionation column, a portion of fresh or purified product water is extracted from an upper, hydrate dissociation region of the fractionation column and reintroduced into a lower portion of the fractionation column at a point above, but generally near, a product water/saline water interface. The difference in density between the reintroduced product water and the fluid in the hydrate fractionation column above the point of reintroduction (water, hydrate, and gas) drives a natural circulation system which enhances the rate at which hydrate rises into the hydrate dissociation region.

Thus, in general, the invention features a method of conducting hydrate-based desalination or water purification in a hydrate fractionation column. The method includes introducing hydrate-forming substance into a lower, hydrate formation region of the hydrate fractionation column where saline or otherwise polluted water to be treated is present and forming positively buoyant or gas-assisted positively buoyant hydrate; allowing the hydrate to rise within the hydrate fractionation column toward a hydrate dissociation region of the hydrate fractionation column; allowing the hydrate to dissociate to release fresh or purified water and the hydrate-forming substance, with the fresh or purified water collecting in the upper, hydrate dissociation region of the hydrate fractionation column; and collecting fresh or purified water product water; The method further includes removing a portion of the fresh or purified water from an upper region of the hydrate fractionation column and reintroducing the removed portion of fresh or purified water into the hydrate fractionation column at a lower, reintroduction region thereof, which reintroduction region is located above the hydrate formation region of the hydrate fractionation column.

A fresh or purified water region of the hydrate fractionation column extends downwardly from the hydrate dissociation region, and a mixture of fresh or purified water, hydrate, and gaseous hydrate-forming substance is present within the fresh or purified water region of the hydrate fractionation column. The removed portion of fresh or purified water is reintroduced into the hydrate fractionation column at a lower region of the fresh or purified water region of the hydrate fractionation column. Thus, a circuitous fluid flow pathway extends from the reintroduction region of the hydrate fractionation column, up along the fresh or purified water region of the hydrate fractionation column, and down along a fresh or purified water down-flow conduit through which the removed portion of fresh or purified water flows to the reintroduction region.

The density of the mixture of fresh or purified water, hydrate, and gaseous hydrate-forming substance that is present in the fresh or purified water region of the hydrate fractionation column is less than the density of the removed portion of fresh or purified water. As a result, a circulatory system of fluid automatically rising within the fresh or purified water region of the hydrate fractionation column and flowing down along the fresh or purified water down-flow conduit is maintained. The rate of flow of the circulatory system can be controlled so as to maintain a desired upward flow rate of hydrate within the fresh or purified water region of the fractionation column.

The inventive method may be practiced in an installation that includes a shaft formed in land, extending deep enough for the weight of water contained in the shaft to generate the requisite hydrate-forming pressures. Alternatively, the inventive method may be practiced in an open-ocean environment.

The inventive method provides a number of distinct benefits or advantages. In particular, reintroducing purified water—either grey water or essentially salt-free water—back down into a lower portion or portions of the hydrate fractionation column where hydrate is present sets up a circulation pattern that greatly enhances the rate at which the hydrate is brought up to the hydrate dissociation region. Because hydrate dissociation is essentially a surface phenomenon—in other words, hydrate dissociates from the surface inwardly, rather than simply crumbling or otherwise disintegrating when it is brought into a lower pressure (or higher temperature) region where it is no longer stable—the faster the hydrate can be brought into the upper part of the dissociation region from which the released fresh water is recovered, the lower the volume of gas released in the lower part of the fresh water area will be. By bringing the hydrate into the upper part of the dissociation region as rapidly as possible—essentially anywhere above the hydrate stability phase boundary, but preferably or ideally into the large tank area at the top of the hydrate fractionation column—the possibility that the fresh water in the column will be excessively infused with gas bubbles is minimized. That is beneficial because excessive gas bubbles in the fresh water portion of the hydrate fractionation column may exert an upward force that lifts or pulls the subjacent seawater upwardly from the lower portions of the column, to the detriment of the desalination process.

Additionally, using somewhat smaller hydrate masses for hydrate-based desalination reduces the required residence time of hydrate in the hydrate formation region. That allows more hydrate to be produced in a given amount of time from which fresh water can be recovered, and it also provides better heat dissipation in the hydrate formation region. Smaller hydrate masses also tend to cause less mixing of fresh water and residual brine, since they cause less turbulence. Therefore, using smaller hydrate masses in the system has certain advantages. The circulation pattern that is implemented by reintroducing purified water into a lower portion of the hydrate fractionation column increases the rate at which the hydrate rises as noted above, and hence improves the fresh water percentage yield for a given total volume of smaller-sized hydrate masses.

Furthermore, reintroducing purified water into the hydrate fractionation column helps prevent seawater and residual brines from the lower part of the fractionation column from being drawn upward with the hydrate as the hydrate rises through the desalination fractionation column. In particular, reintroducing fresh or purified water into the hydrate fractionation column at or near the bottom of the fresh or purified water portion of the fractionation column allows gas that has exsolved from the fluid in the fresh water portion of the fractionation column to increase the overall buoyancy of the fluid in that portion of the fractionation column (a mixture of fresh or purified water, hydrate, and gas) and replaces the fresh or purified water that is moving upward, thus effectively decoupling the upward-pulling buoyancy of the fluid in the upper portion of the hydrate fractionation column from the seawater or residual brines in the lower part of the hydrate fractionation column. This feature is particularly important to maintaining the purity of the water produced by hydrate-based desalination.

BRIEF DESCRIPTION OF THE DRAWINGS

The above and other features and benefits of the invention will become clearer in view of the following description and the associated drawings, in which.

DETAILED DESCRIPTION OF THE INVENTION

Figure 1:
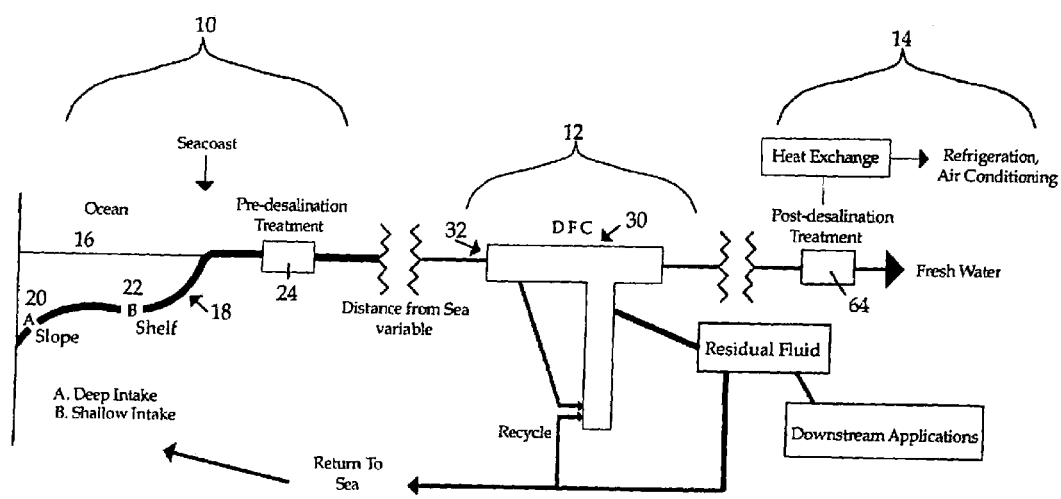
FIG. 1 is a generalized, diagrammatic depiction of a land-based desalination installation.

A land-based desalination installation is shown schematically in FIG. 1 in generalized fashion. The installation may be divided roughly into three sections or regions: an intake portion 10; a water purification portion 12; and post-processing and downstream usage section 14.

The intake portion 10 consists essentially of the apparatus and various subinstallations necessary to extract seawater from the ocean 16 and transport it to the desalination/purification installation at region 12, including subaquatic water intake piping 18 and pumping means (not shown) to draw the water from the ocean and pump it to shore for subsequent processing. Large volume installations can be located relatively close to the sea to reduce the piping distance of the input water to a minimum, and establishing the installation as close to sea level as possible will reduce the cost of pumping against pressure head.

The intake pipeline 18 preferably extends sufficiently out to sea that it draws deep water, e.g., from the slope 20 of the continental shelf because deep water is more pure and colder than shallow water. Alternatively, water may be drawn from locations closer to land, e.g., from areas on the continental shelf 22 where the distance across the shallow water is too great for practice. The precise depth from which water is drawn will ultimately be determined by a number of factors, including primarily the specific embodiment of the desalination fractionation column which is employed, as described below. Ideally, the desalination installation, per se, is located so that the highest part of the fluid-handling system is at or below sea-level to reduce the costs of intake pumping.

Additionally, the water may be pretreated at a pretreatment station 24. Pretreatment consists mainly of de-aeration, filtering to remove particulate matter and degassing, consistent with the requirement that material necessary for hydrate nucleation and growth not be removed from the water.

Figure 2:
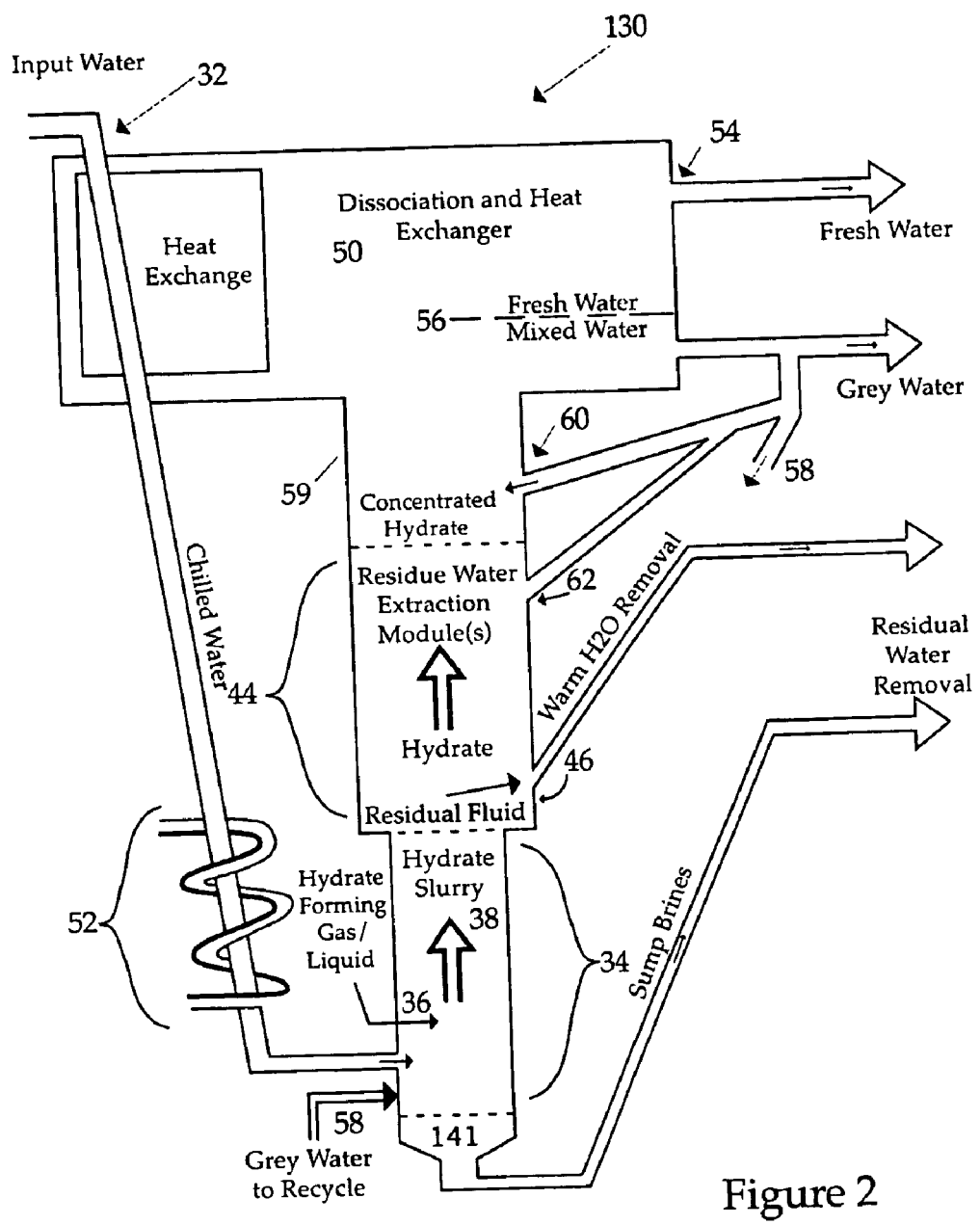
FIG. 2 is a diagrammatic, side elevation view of an embodiment of a desalination fractionation column which utilizes positively buoyant hydrate and which may be employed in the installation shown in FIG. 1.
Figure 3:
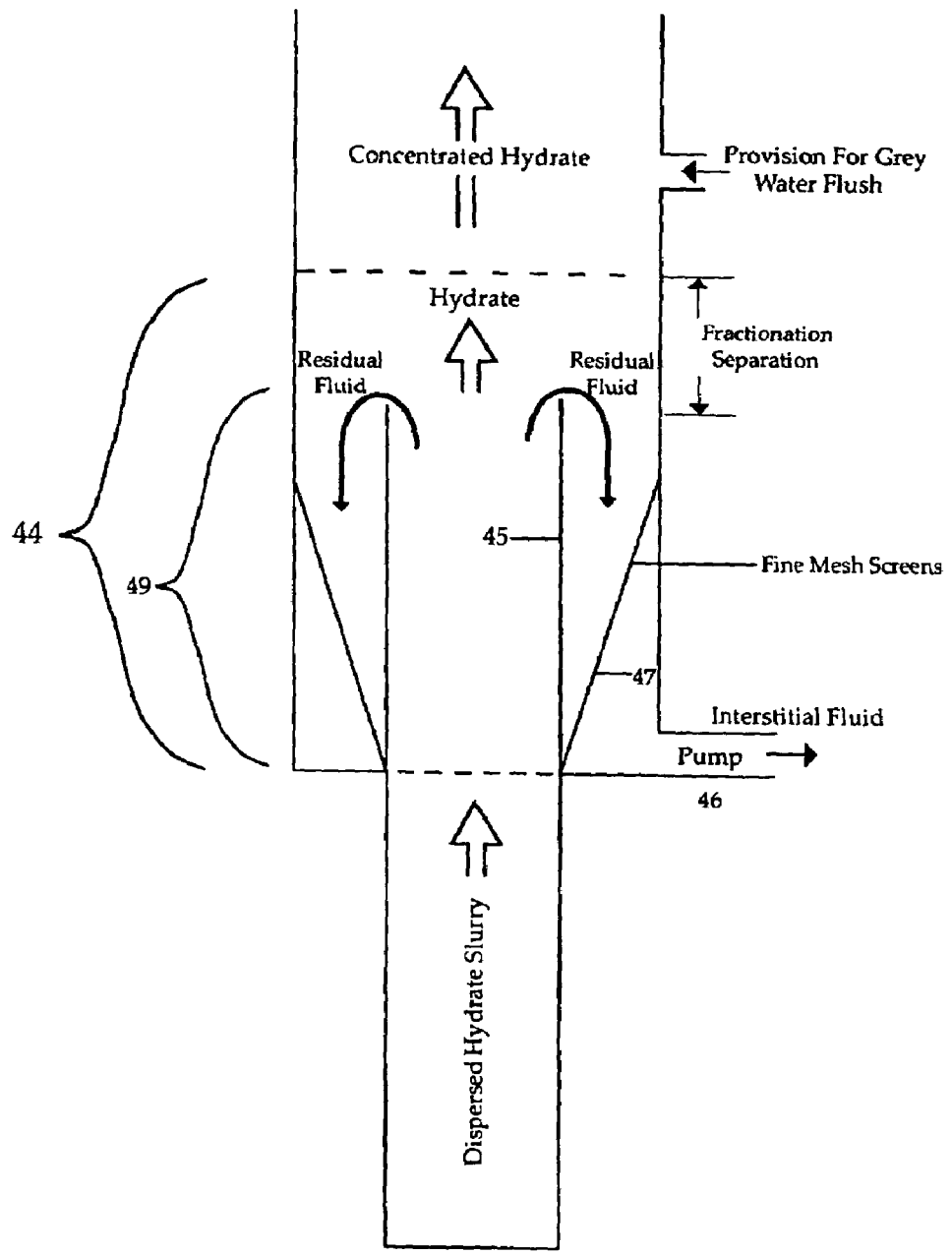
FIGS. 3 and 4 are diagrammatic, side elevation views showing two alternative heat extraction portions of a desalination fractionation column employed in the installation shown in FIG. 1.
Figure 4:
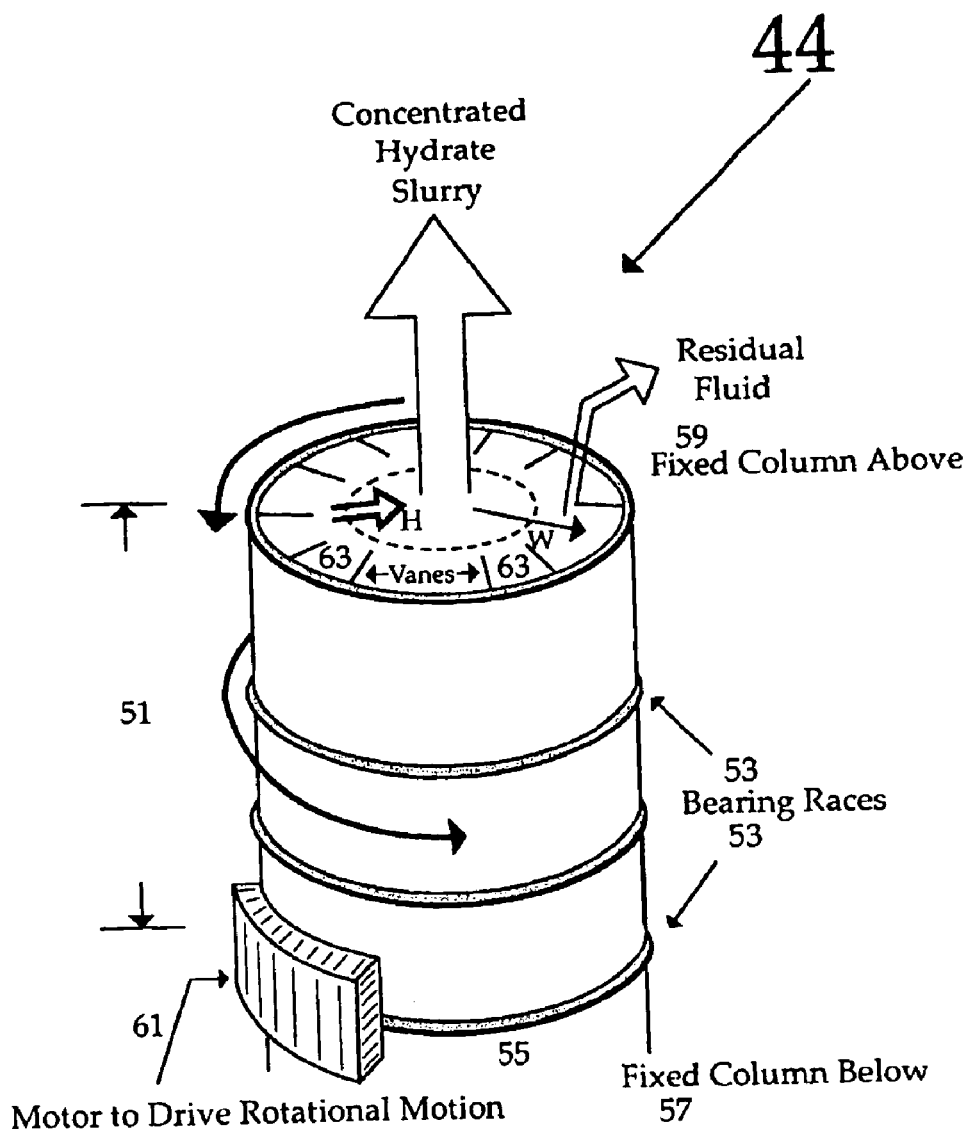

A preferred embodiment of the purification installation 30, per se, is illustrated in FIGS. 2, 3, and 4, which embodiment utilizes positively buoyant hydrate to extract fresh water from seawater. Seawater is pumped into the installation 130 at water input 32 and is pumped down to the lower, hydrate formation section 34 of the installation. The bottom of the hydrate formation section is no more than about 800 meters deep, and perhaps even shallower (again depending on the particular gas or gas mixture being used). A suitable, positively buoyant hydrate-forming gas (or liquid) is injected into the hydrate formation section at 36, and positively buoyant hydrate 38 spontaneously forms and begins to rise through the water column, as is known in the art.

The hydrate-forming gas can be pumped using sequential, in-line, intermediate pressure pumps, with the gas conduit extending either down through the fractionation column, per se, or down through the input water line so that gas line pressure is counteracted by ambient water pressure. As a result, it is not necessary to use expensive, high pressure gas pumps located on the surface. Alternatively, once a gas has been liquified, it can be pumped to greater depths without further significant compression.

Hydrate formation (crystallization) is an exothermic process. Accordingly, as the positively buoyant hydrate forms and rises automatically through the water column—forming a hydrate "slurry" as hydrate crystals continue to nucleate and grow as they rise, until the hydrate-forming gas is used up—the surrounding water, which will increasingly become a concentrated saline "residue," will be heated by the heat energy released during crystallization of the hydrate.

Below a certain salinity, the heated residual seawater will have a relatively decreased density and will rise in the column along with the hydrate 38. When the salinity of the residual seawater rises high enough due to the extraction of fresh water from it, however, the highly saline residual seawater will sink to the bottom of the water column. This highly saline residual seawater is collected in sump (also FIG. 5, 141) at the bottom of the fractionation column and is removed.

As the slurry of hydrate and heated residual seawater rises in the fractionation column, heated residual seawater is removed from the system in heat extraction portion 44 of the fractionation column at one or more points 46. The heat extraction section 44 is shown in greater detail in FIG. 3. As illustrated in FIG. 3, for one mode of separation of hydrate and slurry, water is pumped from the system as part of the vertical fractionation process. This is accomplished through a two-stage process. An internal sleeve 45 allows a primary separation to take place, as a water trap 49 is formed below the top of the sleeve. Hydrate continues to rise, while water floods the entire section 44. Water is pumped from below the level at which hydrate exits from the top of the sleeve through fine conical screens 47. These are designed to obstruct the passage of particulate hydrate. (The screens can be heated periodically to clear them of hydrate when flow restriction exceeds design limits.) Residual water is drawn off at a slow enough rate that any hydrate that may reside within water drawn toward the screen has a greater tendency to rise buoyantly than the tendency toward downwards or sideways movement associated with the force of suction of the drawn-off water. Very buoyant gas rises and stays within the column.

An alternative configuration 44' of the heat extraction zone is shown in FIG. 4. In this configuration, a centrifuge is used to allow a separate, mechanically-driven density fractionation system to operate. In this configuration, a segment 51 of the column is made mobile and capable of rotary movement. The mobile, rotary centrifuge column segment is carried by bearings 53 at the base 55 and at intervals along its height to keep it in vertical alignment with the entirety of the column, and to allow it to rotate with respect to the portions 57, 59 of the column above and below it. This section is motor-driven, using a hydraulic system 61 driven from the surface. Vanes 63 within the centrifuge section will cause the water column to rotate, which vanes are designed based on turbine vane design to cause the hydrate-residual water in the section to rotate without turbulence and with increasing velocity toward the top of the section where residual water is extracted. Gravity "settling" or fractionation works here in a horizontal plane, where the heavier residual water "settles" toward the sides of the column while the lighter, more buoyant hydrate "settles" toward the center of the column. The hydrate continues to rise buoyantly and concentrates in the center of the centrifuge section. It will be appreciated that more than one such centrifuge section may be employed.

As the hydrate rises into the upper, dissociation and heat exchange region 50 of the desalination fractionation column, the depth-related pressures which forced or drove formation of the hydrate dissipate; accordingly, the hydrate, which is substantially in the form of a slurry, will be driven to dissociate back into the hydrate-forming gas (or mixture of gases) and fresh water. However, regardless of the particular method used to extract the warmed residual seawater, heat energy in the surrounding seawater which ordinarily (i.e., in the prior art) would be absorbed by the hydrate as it dissociates is no longer available to the hydrate. Therefore, because heat has been removed from the system by extracting warmed residual seawater in the heat extraction portion 44 of the apparatus, a net or overall cooling bias is created in the upper, dissociation and heat exchange portion 50 of the installation.

This cooling bias is capitalized upon to significant advantage. In particular, as indicated schematically in FIG. 2, water being pumped into the system (at 32) is passed in heat exchanging relationship through the regions of dissociating hydrate. For example, it is contemplated that the dissociation and heat exchange portion 50 may be constructed as one or more large, individual enclosures on the order of one hundred meters across. The input water will pass via a series of conduits through the regions of dissociating hydrate and will be cooled significantly as it does so. In fact, although some initial refrigeration will be required at start-up of the process, which initial refrigeration may be provided by heat exchange means 52, the installation eventually will attain a steady-state condition in which the amount of heat energy transferred from the input water to the dissociating hydrate is sufficient to cool the input water to temperatures appropriate for spontaneous formation of hydrate at the particular depth of the dissociation column.

Ideally, the input water is stabilized at about 6 or 7° C. or below. This is because below that temperature, the density of the water increases, which enhances separation of the hydrate-water slurry formed by injections of the gas. Additionally, at a given pressure, hydrate nucleation proceeds faster at colder water temperatures. During the start-up period, the system is run in a mode of maximum warm fluid extraction (to create a state of induced thermal bias) before equilibrium or steady-state is reached; although the duration of this start-up period will vary depending on the particular installation parameters, the design goal is that once steady-state is reached, the system can be run for extremely long operating periods without being shut down, i.e., periods on the order of years. Controlling residue water extraction, and thus heat removal, maintains a steady-state condition so that the apparatus does not keep cooling to below steady-state operating conditions.

Once the hydrate has dissociated into its constituent fresh water and gas or gases, the fresh water is pumped off, e.g. as at 54, and the gas is captured and recycled. (Provisions may be made for liquifying certain gases where this is desired.) Additionally, a portion of the water in the dissociation and heat exchange region 50 will be "grey water," which is fresh water containing some small portion of salts that have been removed from the hydrate by washing of the hydrate with water. The distinction between the "gray" or mixed water and pure fresh water is indicated schematically by dashed line 56. The grey water may be suitable for drinking, depending on the salt concentration, or for agricultural or industrial use without further processing. The cold, gray water may be recycled back into the fractionation column, either by pumping it back down to the hydrate formation section 34, as indicated at 58; or it may be injected back into the concentrated hydrate slurry at a region of the fractionation column located above the heat extraction portion 44, as indicated at 60, to increase the fluid nature of the hydrate slurry and to aid in controlling overall thermal balance of the system. Furthermore, providing grey water at 62 to dilute residual interstitial fluid allows for pre-dissociation washing.

As further shown in FIG. 1, in the post-processing and downstream usage section 14, the fresh water preferably is treated by secondary treatment means 64. The secondary treatment means may include, for example, fine filtering, gas extraction, aeration, and other processing required to bring the water to drinking water standard.

Moreover, it is extremely significant that depending on operating parameters such as temperature of the source water, the amount of residual seawater extracted in the heat extraction section 44, dimensions of the installation, and other parameters such as viscosities of fluids within the system; buoyancy of the hydrate relative to all fluids within the system; salinity and temperature of residual water; the design output requirements of fresh water; salinity and temperature of input water; design cooling requirements; system inefficiencies affecting thermal balance; etc., the fresh water produced will be significantly cooled. This cooled water can be used to absorb heat from other applications or locations such as the insides of buildings, and hence can be used to provide refrigeration or provide for air-conditioning.

Finally, once the seawater has been cycled through the desalination fractionation column and downstream processing applications a desired number of times, the residual, concentrated seawater (which may be highly saline in nature) is simply pumped back to sea. Alternatively, it may be retained for those who desire it.

With respect to overall design, engineering, and construction considerations for the system, it is contemplated that the desalination fractionation column 130 will be on the order of 15 to 20 meters in diameter, or even larger. Conventional excavation and shaft-lining methodologies common to the mining and tunneling industry can be used in the construction of the column 130. Overall dimensions will be determined based on the total desired fresh water production desired and relevant thermodynamic considerations. For example, one cubic meter of methane hydrate has the capacity to warm about 90 to 100 cubic meters of water by about 1° C. as it forms, and that same cubic meter of hydrate has the capacity to cool about 90 to 100 cubic meters of water by about 1° C. as it dissociates. (Mixes of suitable gases have higher heats of fusion, which makes the process more efficient.) Required cooling therefore will, in part, determine hydrate production rates, and hence dimensions of the system and the choice of gas or gases to meet those production rates.

Preferably, the diameter of the residual fluid removal column segment is larger. This facilitates buoyant, upward movement of the hydrate through the water column while first allowing separation of residue water from the hydrate in the heat extraction region 44, and then dissociation and heat exchange in the dissociation and heat exchange region 50.

The dissociation and heat exchange region 50 may be constituted not just by a single dissociation "pool," as shown schematically in FIG. 2, but rather may consist of a number of linked, heat-exchanging devices in a number of different water treatment ponds or pools. The actual depth, size, throughput, etc. will depend on the production rate, which will depend, in turn, on the temperature of the input water, the particular gas or gas mixture used to form the hydrate, the rate at which heat can be removed from the system, etc.

The input of water into the base of the fractionation column can be controlled by a device (not shown) that alters the input throat diameter so as to facilitate mixing of the gas and water, thereby promoting more rapid and complete hydrate formation. Alternatively or additionally, hydrate formation can be enhanced by creating flow turbulence in the input water, just below or within the base of the hydrate forming gas injection port 36. It may further be desirable to vary the diameter of the desalination fraction column in a manner to slow the buoyant descent of the hydrate slurry, thereby enhancing hydrate formation.

The dissociation and heat exchange region 50 will be significantly wider and larger than the lower portions of the desalination column. This is because hydrate will be floating up into it and dissociating into gas and fresh water at a rate that is faster than that which could be accommodated in a pool that is the diameter of the column itself. Moreover, the requirement for heat will be great; if sufficient heat cannot be provided, water ice will form and disrupt the desalination process. Provision for physical constriction within a column will hold hydrate below the level where it dissociates freely, thus providing for a control on the amount of gas arriving at the surface. This is done for both normal operational and safety reasons.

Because the positively buoyant hydrate used in this embodiment of the invention floats, fresh water tends to be produced at the top of the section, thereby minimizing mixing of fresh and saline water. To inhibit unwanted dissociation, the heat exchanger apparatus may extend downward to the top of the residual water removal section. The dissociation and heat exchange pools do not need to be centered over the water column; moreover, more than one desalination fractionation column may feed upward into a given dissociation and heat exchange pool. Similarly, groups of desalination fraction columns can be located close together so as to be supported by common primary and secondary water treatment facilities, thereby decreasing installation costs and increasing economy.

In addition to large-scale installations, relatively small-scale installations are also possible. For these installations, smaller diameter desalination columns can be constructed in locations where lower volumes of fresh water are required. Although overall efficiency of such systems will be lower than larger scale systems, the primary advantage of such small-scale installations is that they can be implemented using standard drilling methods. Furthermore, mass-produced, prefabricated desalination apparatus sections can be installed in the casings of drilled holes; this allows the installation to be completed in a relatively short period of time. Capital cost of such an installation also is reduced, as fabrication of the components can be carried out on an industrialized basis using mass production techniques. The various operating sections of a smaller-scale installation might be replaced by extracting them from their casing using conventional drilling and pipeline maintenance techniques.

Figure 5:
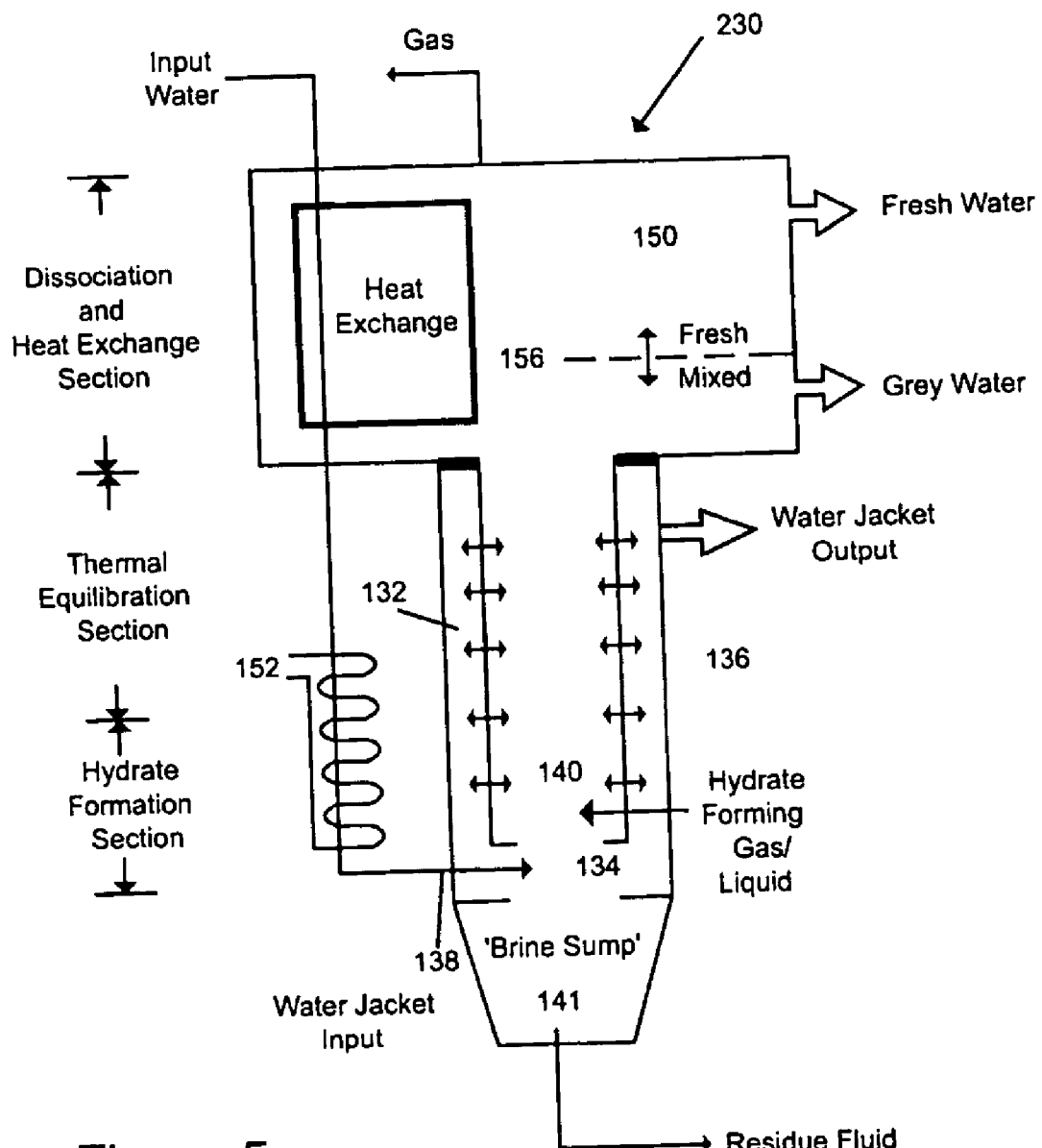
FIG. 5 is a diagrammatic, side elevation view of another embodiment of a desalination fractionation column which utilizes positively buoyant hydrate and which may be employed in the installation shown in FIG. 1.

An alternate, slightly simplified embodiment 230 of a desalination fractionation column according to the invention is shown in FIG. 5. In this embodiment, hydrate formation occurs essentially within a thermal equilibration column 132. The thermal equilibration column 132 has an open lower end 134 and is suspended in shaft 136. In this embodiment, input water is injected near the base of the desalination column 132, e.g. as at 138, preferably after passing through heat exchange and dissociation region 150 of the column 230 in similar fashion to the embodiment shown in FIG. 2. Positively buoyant hydrate-forming gas is injected into the lower portions of the thermal equilibration column 132, as at 140, and hydrate will form and rise within the column 132 much as in the previous embodiment. The embodiment 230 is simplified in that heat of formation of the hydrate is transferred to water surrounding the thermal equilibration column 132 within a "water jacket" defined between the walls of the column 132 and the shaft 136 in which the desalination fractionation column is constructed. To this end, the hydrate formation conduit preferably is made from fabricated (i.e., "sewn") artificial fiber material, which is ideal because of its light weight and its potential for being used in an open weave that greatly facilitates thermal equilibration between residual saline water within the thermal equilibration column 132 and seawater circulating within the water jacket.

As is the case with the embodiment shown in FIG. 2, warmed water is pumped out of the system, this warmed water being water which has circulated within the water jacket. In contrast to the embodiment shown in FIG. 2, however, the intent of removing warmed water from the water jacket is not to remove so much heat energy that the input water is automatically cooled to temperatures suitable for formation of the hydrate at the base of the column, but rather it is simply to remove enough heat energy to prevent water within the interior of the hydrate formation conduit from becoming so warm that hydrate cannot form at all. Accordingly, the rate at which warm water is removed from the water jacket may be relatively small compared to the rate at which warm water is removed from the heat extraction portion 44 of the embodiment shown in FIG. 2. As a result, it is necessary to supplement the cooling which takes place in the heat exchange and dissociation region 150 using supplemental "artificial" refrigeration means 152. Operation is otherwise similar to that of the embodiment shown in FIG. 2: fresh water is extracted from the upper portions of the heat exchange and dissociation portion 150; "gray water" is extracted from lower portions of the heat exchange and dissociation region 150, i.e., from below the line of separation 156; and concentrated brine is removed from brine sump 141.

Figure 6:
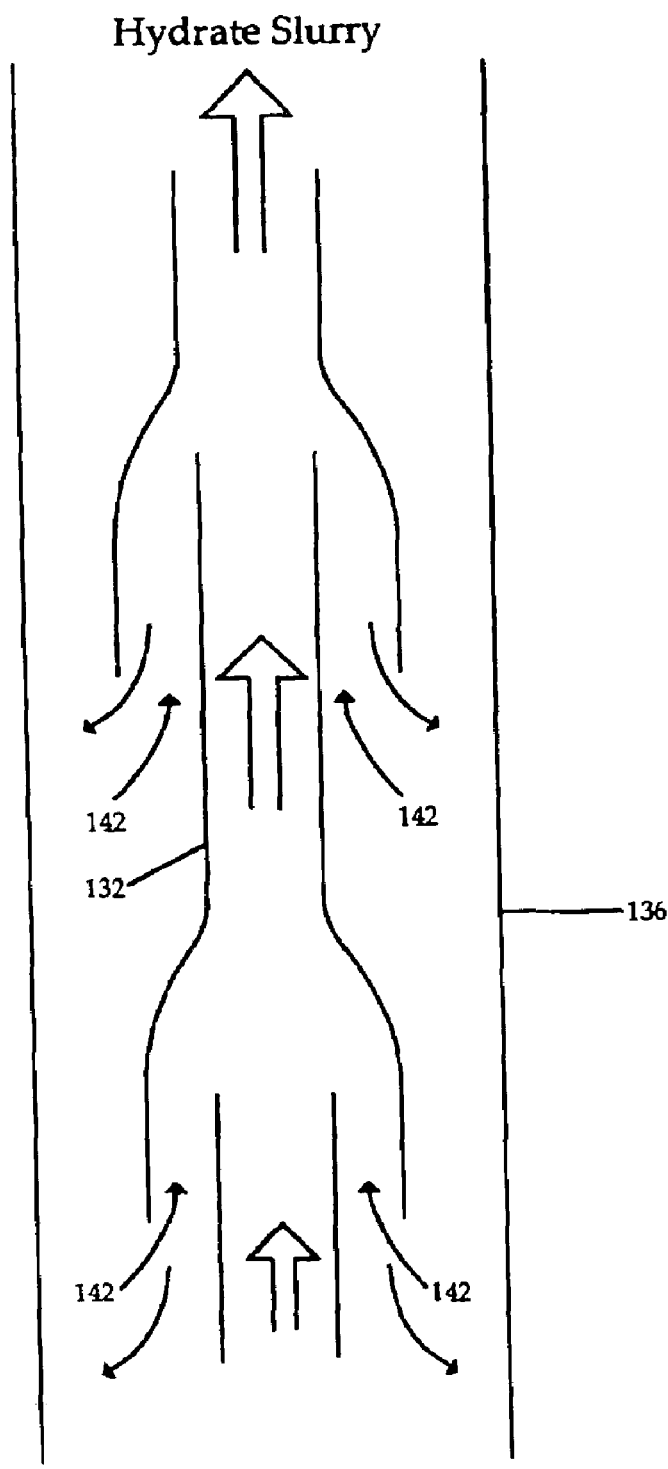
FIG. 6 is a diagrammatic, side elevation view showing overlapping water vents used in the desalination fractionation column shown in FIG. 5.

To facilitate "settling out" of brine which is sufficiently dense to be negatively buoyant due to concentration and/or cooling, and to facilitate heat transfer and thermal equilibration, the equilibration column 132 preferably is constructed with overlapping joints, as shown in FIG. 6. This configuration permits the buoyant hydrate to rise throughout the column, while cooled, more saline water can flow out through the vents 142, as indicated schematically.

Figure 7:
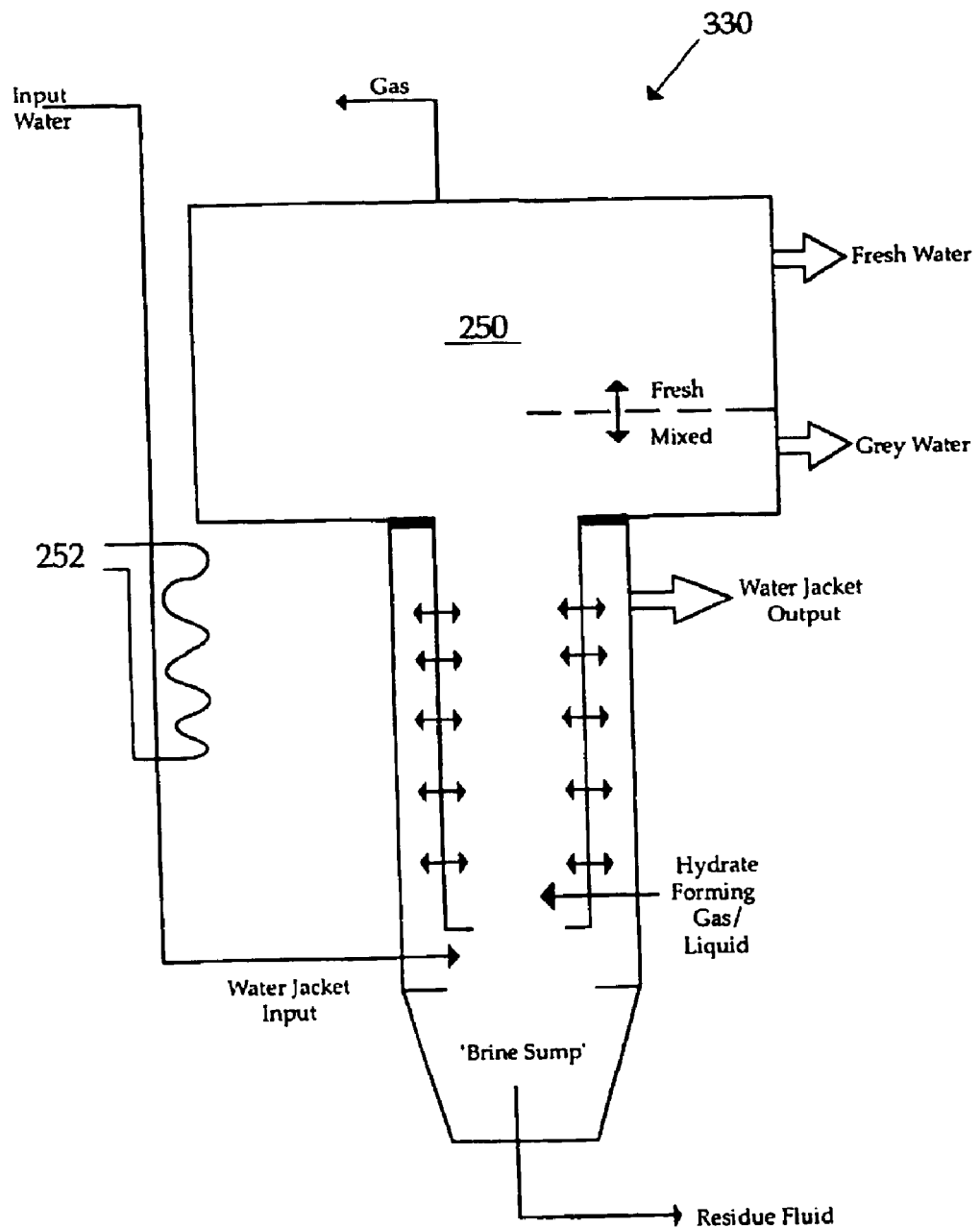
FIG. 7 is a diagrammatic, side elevation view of yet another embodiment of a buoyant hydrate-based desalination fractionation column employed in the installation shown in FIG. 1, which embodiment is similar to that shown in FIG. 5.

The desalination fractionation column installation may be further simplified by feeding the input water into the system without passing it through the dissociation section 250 of the embodiment 330 shown in FIG. 7. If the input water is not sufficiently cold, more artificial refrigeration will need to be provided by refrigeration means 252, but operation is otherwise the same as embodiment 230 shown in FIG. 5.

Figure 8:
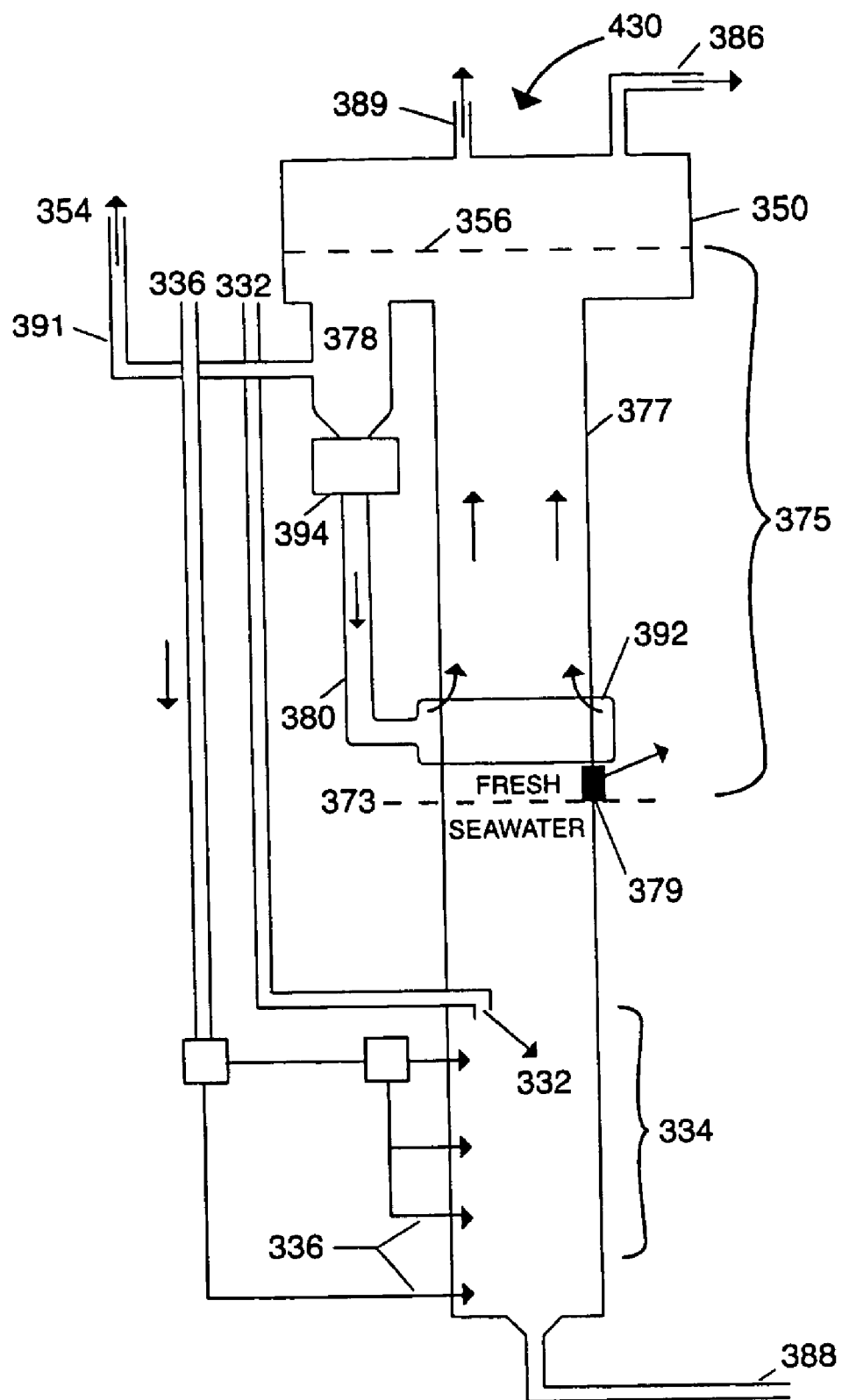
FIGS. 8–10 are diagrammatic, side elevation views of three additional embodiments of a buoyant hydrate-based desalination fractionation column, similar to the embodiment illustrated in FIG. 2 and configured to increase internal, hydrate-raising circulation within the fractionation column.
Figure 9:
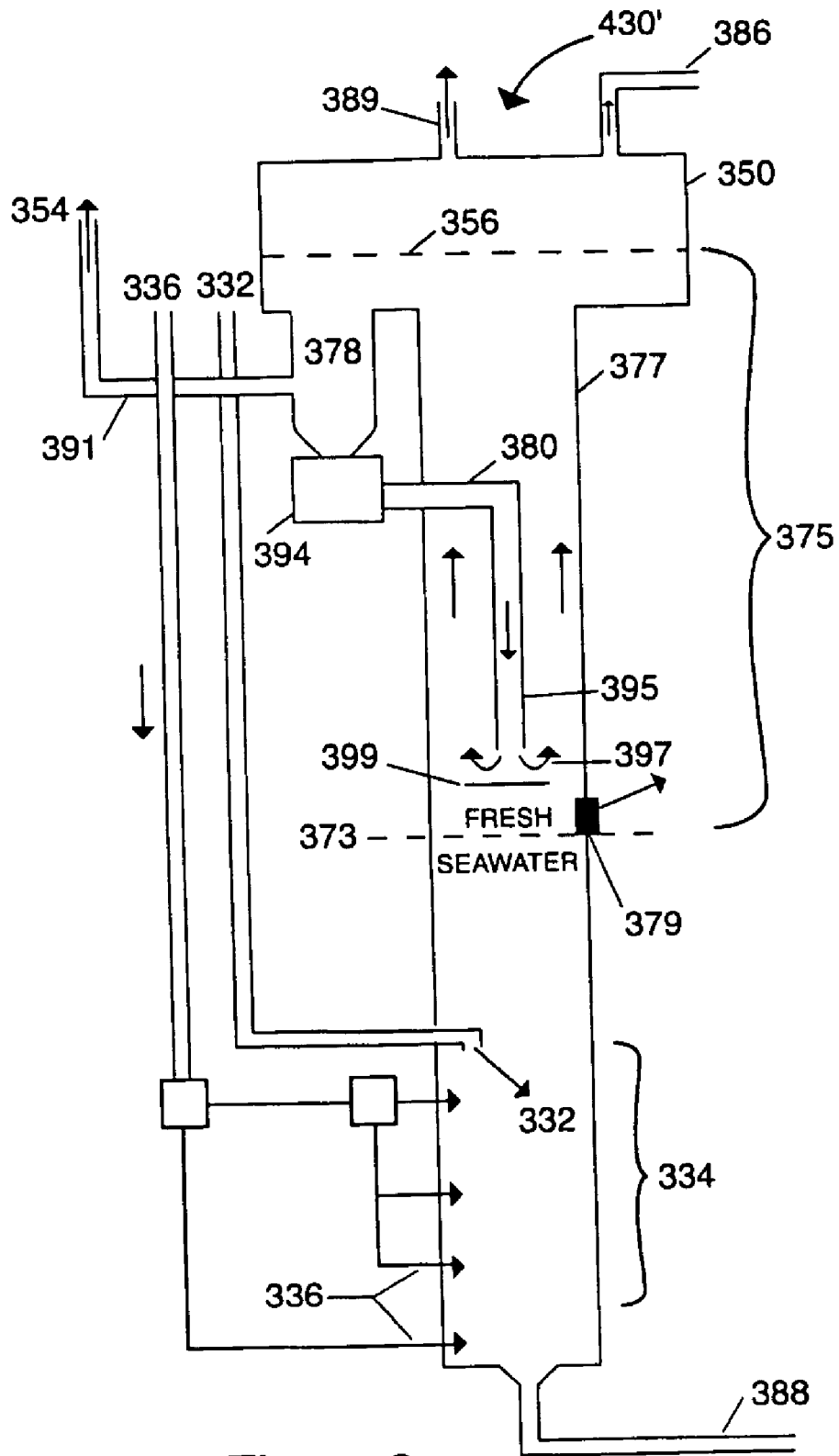
Figure 10:
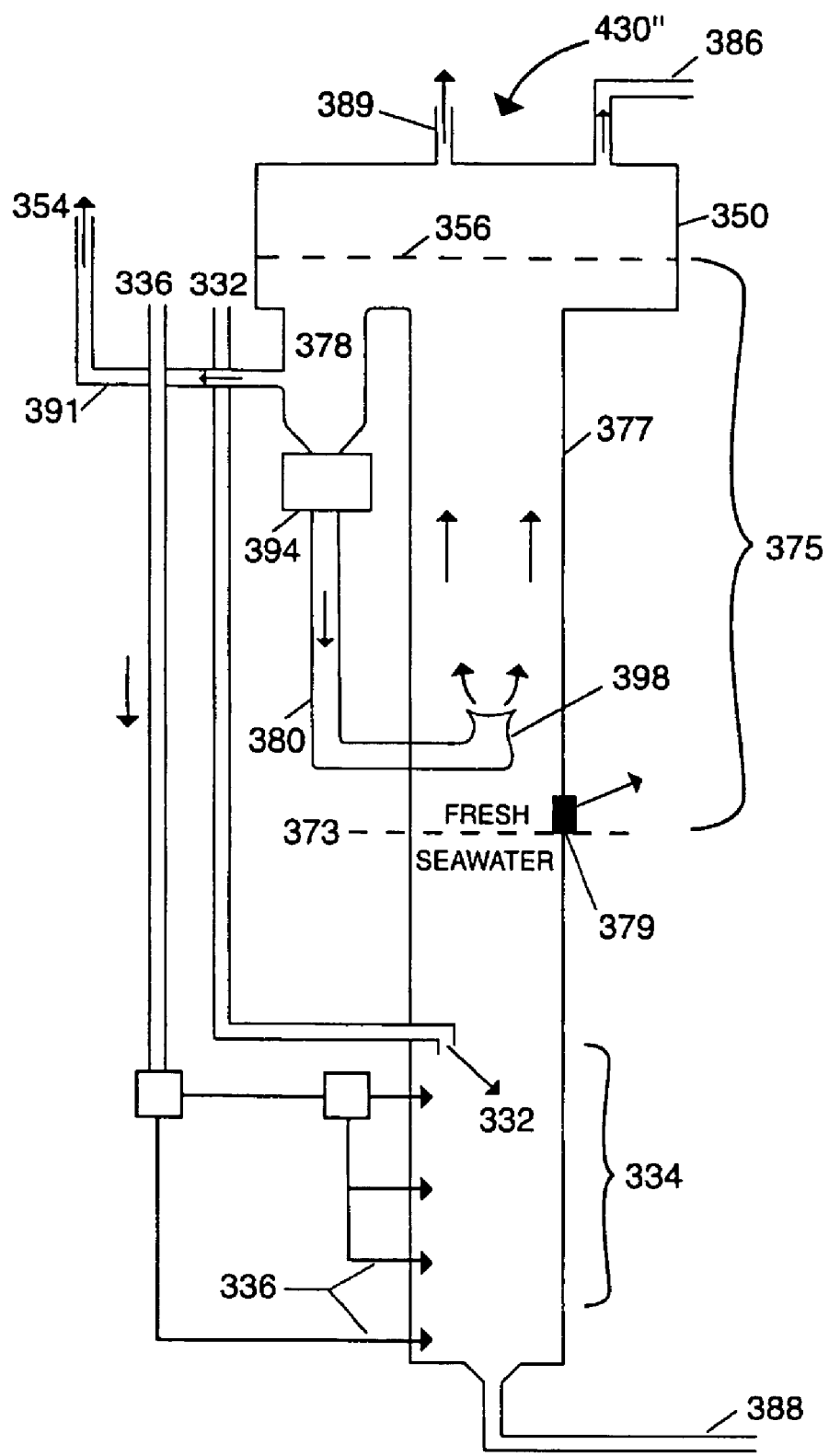

For brevity of presentation of this continuation-in-part application, FIGS. 8–10 and the associated text from the applications and patents referenced above, which have been incorporated by reference, are not presented herein explicitly. For purposes of understanding the full range of applicability of the embodiments described below, it suffices to note that that disclosure addresses, inter alia, performing hydrate-based desalination using hydrate that, per se, is negatively buoyant by causing the hydrate to form in a manner which traps hydrate-forming gas within a hydrate shell or lattice, thus producing "assisted buoyancy" hydrate masses that, in toto, are positively buoyant.

For further purposes of understanding the embodiments described below, reference may also be had to pending U.S. patent application Ser. No. 09/941,545 filed Aug. 30, 2001 (Publication No. 20020003111, Jan. 10, 2002), which discloses, inter alia, 1) an embodiment in which flow through the system is controlled such that the hydrate is caused to separate from the residual brine at or substantially at its point of formation and heated residual brine flows substantially down and out of the hydrate fractionation column from a lower portion thereof, thus transporting the heat of exothermic hydrate formation away from the hydrate as soon as possible; and 2) pre-treating the water to be treated with hydrate-forming gas. That U.S. Patent Application is based on and claims priority from provisional U.S. Patent Application Ser. Nos. 60/230,790, filed Sep. 7, 2000, and 60/240,986, filed Oct. 18, 2000. The contents of all three applications (60/230,790, 60/240,986, and Ser. No. 09/941,545) are incorporated herein by reference, and priority is claimed to each of those three applications. This application also incorporates by reference and claims priority from pending U.S. patent application Ser. No. 09/987,725 filed Nov. 15, 2001 to the extent it also discloses pre-treating the water to be treated with hydrate-forming gas.

Still further, this application incorporates by reference and claims priority from pending U.S. patent application Ser.

No. 10/402,940 filed Apr. 11, 2003. As summarized in that application, the invention that is the subject of that application extends the concepts disclosed in provisional U.S. Patent Application Ser. No. 60/240,986 and non-provisional U.S. patent application Ser. No. 09/941,545, incorporated by reference above. In doing so, that invention capitalizes on a recently discovered phenomenon, namely, that introducing hydrate into a gas/water system containing a hydrate-forming gas dissolved therein will lower the saturation point of the system in the vicinity of the introduced hydrate such that, depending on initial gas concentration and pressure and temperature conditions, the local system can, very quickly, be rendered supersaturated by the presence of the hydrate. As a result, molecules of the hydrate-forming substance will be induced to be incorporated rapidly into the hydrate mass causing such supersaturation. Thus, by providing a system in which hydrate is present within a field of water to be treated that has had hydrate-forming substance dissolved in it, initial hydrate "kernels" can be grown outwardly into the surrounding water space to form relatively large, solid hydrate masses on the order of several centimeters across or larger. Such hydrate masses, which tend to be rounded or generally ball-shaped, minimize or prevent various difficulties that can occur when the hydrate forms essentially a slurry of fractured shells.

Preferably, according to U.S. patent application Ser. No. 10/402,940, hydrate-forming substance is introduced into the water to be treated at multiple locations, and it can be introduced in different ways depending on where it is introduced. In particular, some hydrate-forming substance is mixed with the water to be treated at what may be referred to as a "substantially upstream" location. That is a location where pressure and temperature conditions (pressure conditions, in particular) are not suitable for hydrate to form. Therefore, the hydrate can be introduced in an extremely vigorous manner, such that as much hydrate-forming substance is dissolved into the water to be treated in as quick a manner as possible. More hydrate-forming substance is introduced at what may be referred to as a "somewhat upstream" location. That is a location where conditions are such that hydrate would be stable if it formed, but which is upstream of the hydrate formation region (the region where it is intended for hydrate to form). Hydrate is not intended to be formed at the somewhat upstream location. In order to avoid forming hydrate in the inflowing water to be treated at somewhat upstream locations, the hydrate-forming substance is introduced in a careful, non-energetic manner. To that end, the hydrate-forming substance preferably is infused into the water on a molecular basis. Still further hydrate-forming substance is preferably dissolved into the water to be treated at a "co-located" location. That is a location that is approximately right at or generally within the hydrate formation region, or even slightly below it assuming downward overall system flow. As is the case for the somewhat upstream locations, the hydrate-forming substance is introduced into the water to be treated at such co-located locations in a careful, non-energetic manner, e.g., by being infused into the water on a molecular basis.

With the disclosure of these incorporated-by-reference applications in mind, the embodiments of the invention illustrated in FIGS. 8–10 may be better understood and/or appreciated.

As illustrated and described above in connection with FIG. 2, generally purified water (e.g., "gray water") may be drawn from the upper reaches of the hydrate fractionation column and recirculated back down and reintroduced into a lower portion of the hydrate-fractionation column, where hydrate still exists. Reintroducing purified water—either grey water or essentially salt-free water—back down into a lower portion or portions of the hydrate fractionation column where hydrate is present sets up a circulation pattern that greatly enhances the rate at which the hydrate is brought up to the hydrate dissociation region, which provides a number of benefits.

First, because hydrate dissociation is essentially a surface phenomenon—in other words, hydrate dissociates from the surface inwardly, rather than simply crumbling or otherwise disintegrating when it is brought into a lower pressure (or higher temperature) region where it is no longer stable—the faster the hydrate can be brought into the upper part of the dissociation region from which the released fresh water is recovered, the lower the volume of gas released in the lower part of the fresh water area will be. By bringing the hydrate into the upper part of the dissociation region as rapidly as possible—essentially anywhere above the hydrate stability phase boundary, but preferably or ideally into the large tank area at the top of the hydrate fractionation column—the possibility that the fresh water in the column will be excessively infused with gas bubbles is minimized. That is beneficial because excessive gas bubbles in the fresh water portion of the hydrate fractionation column may exert an upward force that lifts or pulls the subjacent seawater upwardly from the lower portions of the column, to the detriment of the desalination process.

Additionally, using somewhat smaller hydrate masses for hydrate-based desalination reduces the required residence time of hydrate in the hydrate formation region. That allows more hydrate masses to be produced in a given amount of time from which fresh water can be recovered, and it also provides better heat dissipation in the hydrate formation region. Smaller hydrate masses also tend to cause less mixing of fresh water and residual brine, since they cause less turbulence. Therefore, using smaller hydrate masses in the system has certain advantages. The circulation pattern that is implemented by reintroducing purified water into a lower portion of the hydrate fractionation column increases the rate at which the hydrate rises as noted above, and hence improves the fresh water percentage yield for a given total volume of smaller-sized hydrate masses.

Furthermore, reintroducing purified water into the hydrate fractionation column helps prevent seawater and residual brines from the lower part of the fractionation column from being drawn upward with the hydrate as the hydrate rises through the desalination fractionation column. In particular, reintroducing fresh or purified water into the hydrate fractionation column at or near the bottom of the fresh or purified water portion of the fractionation column allows gas that has exsolved from the fluid in the fresh water portion of the fractionation column to increase the overall buoyancy of the fluid in that portion of the fractionation column (a mixture of fresh or purified water, hydrate, and gas) and replaces the fresh or purified water that is moving upward, thus effectively decoupling the upward-pulling buoyancy of the fluid in the upper portion of the hydrate fractionation column from the seawater or residual brines in the lower part of the hydrate fractionation column. This feature is particularly important to maintaining the purity of the water produced by hydrate-based desalination.

As noted above, the concept of reintroducing purified water from the upper reaches of the hydrate fractionation column, e.g., from the hydrate dissociation region, back down into lower regions of the hydrate fractionation column is disclosed in FIG. 2 and the associated text. The embodiments of the invention illustrated in FIGS. 8–10 maximize the circulation-generating potential of that concept.

In general, the three embodiments for performing hydrate-based desalination illustrated in FIGS. 8–10 are similar, differing only in the particular manner in which purified water is reintroduced into the hydrate fractionation column 377 near the bottom of what may be regarded as the fresh or purified water section 375 of the water column. Therefore, the same reference numerals are used to describe components of the system that are the same in each of the three embodiments. The three embodiments may employ hydrate-forming substances (e.g., gas or gas mixtures) that produce positively buoyant hydrate or assisted buoyancy hydrate.

The three embodiments each include a lower, hydrate formation region 334, where pressure is sufficient for hydrate to form. After being chilled if necessary, e.g., by passing through hydrate that is dissociating in the hydrate dissociation region 350 (not illustrated) and/or by auxiliary chillers (not illustrated) as disclosed in the embodiments illustrated and described above, water to be treated 332 flows into the hydrate formation region 334. (Alternatively, the need to chill the water to be treated may be avoided if water to be treated of suitably low temperature is used.) A hydrate-forming gas or gas mixture 336 is introduced into the hydrate formation region 334 at a number of various locations, as illustrated.

As disclosed in U.S. patent application Ser. No. 10/402,940 as well as U.S. patent application Ser. No. 09/941,545, the water to be treated may be pre-treated with hydrate-forming gas by dissolving the hydrate-forming gas into it at a number of different locations, with the manner in which the hydrate-forming gas is introduced into the water to be treated varying depending on where the hydrate-forming gas is introduced into the water to be treated. For example, hydrate-forming gas can be introduced into the water to be treated at a "substantially upstream" location, i.e., a location where pressure and temperature conditions (pressure conditions, in particular) are not suitable for hydrate to form. There, the hydrate can be introduced in an extremely vigorous manner such that as much hydrate-forming substance is dissolved into the water to be treated as quickly as possible. Means for dissolving hydrate-forming gas into the water to be treated at such a substantially upstream location are not illustrated. More hydrate-forming gas may be introduced at a "somewhat upstream" location, i.e., a location where conditions are such that hydrate would be stable if it formed but which is upstream of the hydrate formation region (the region where it is intended for hydrate to form). Hydrate is not intended to be formed at this somewhat upstream location; therefore, in order to avoid forming hydrate in the inflowing water to be treated at somewhat upstream locations, the hydrate-forming gas is introduced in a careful, non-energetic manner. Means for introducing the hydrate-forming gas at somewhat upstream locations are not illustrated, either. Means are, however, illustrated for introducing and dissolving hydrate-forming gas into the water to be treated at a co-located location, i.e., a location that is approximately right at or generally within the hydrate formation region, or even slightly below it. As is the case for the somewhat upstream locations, the hydrate-forming substance is introduced into the water to be treated at such co-located locations in a careful, non-energetic manner, e.g., by being infused into the water on a molecular basis. Preferably, enough hydrate-forming gas is dissolved into the water to be treated among the various locations for the water to be treated within the hydrate formation region 334 to be saturated, virtually saturated, or even super-saturated with hydrate-forming gas.

As also disclosed and illustrated in U.S. patent application Ser. No. 09/941,545, the hydrate fractionation column 377 is arranged, and flow of water to be treated into the column and flow of residual brine out of the column are controlled, such that the hydrate separates from the residual brine at or substantially at its point of formation and the heated residual brine flows substantially downward and out of the hydrate fractionation column 377 from a lower portion thereof, e.g., via brine removal conduit 388.

Because the hydrate is positively buoyant or positively buoyant in toto (i.e., assisted buoyancy), it will rise within the hydrate fractionation column 377. As it does so, pressure within the column decreases with decreasing depth. Above a certain depth 373, the pressure will no longer be sufficient for the hydrate to remain stable, and the hydrate will begin to dissociate.

Preferably, the overall downward flow of water to be treated and the effluent residual brine, along with the circulatory flow pattern of fresh or purified water described in greater detail below, are controlled along with various other operating parameters such as temperature gradients, chill rates, etc. so that a relatively distinct boundary (zone) between fresh or purified water and seawater exists and so that that boundary is located at or near the hydrate pressure stability depth 373. Mixed salinity water is preferably expelled via a salinity-controlled orifice 379 to maintain a relatively distinct separation between the lower seawater/residual brine region of the water column and the fresh or purified water region of the water column.

As the hydrate dissociates, it releases the hydrate-forming gas, which will exist in free or bubble form. Hydrate-forming gas will also come out of solution if some of the gas-saturated water to be treated rises high enough within the hydrate fractionation column 377 for the pressure to decrease to the point that the seawater or residual brine is oversaturated. Additionally, there may be hydrate-forming gas that has been injected into the hydrate formation region 334 in free or bubble form that has not participated in hydrate formation. As a result, the fluid within the fresh or purified water section 375 of the hydrate fractionation column 377 will consist largely of a mixture of water (primarily fresh), hydrate, and free gas.

In the dissociation region 350, the hydrate-forming gas will naturally separate from the fresh water and concentrate in the upper part of the apparatus, above the gas/water interface 356. Free gas that collects in the upper part of the apparatus is removed via take-off conduit 386 to a gas collection and processing/removal system (not shown), and pressure within the dissociation region 350 may be controlled or regulated by means of a separate gas take-off vent 389, which also serves as an emergency vent.

A water collection, take-off, and recirculation manifold 378, which is a downward extension from the dissociation region 350 that allows for degassing as gas bubbles migrate upward and separate from water being drawn downward and that provides a number of take-off points for produced and recirculated fresh water, extends downward from the hydrate dissociation region 350, and fresh or purified product water 354 is collected from the system via take-off conduit 391. Because the fluid in the fresh or purified water portion 375 of the hydrate fractionation column 377 consists of a mixture of water, hydrate, and gas, with the overall density of the fluid decreasing with decreasing depth due to the exsolution and expansion of gas within that portion of the installation, whereas the fluid in the manifold 378 is essentially fresh or purified water with, perhaps, a much smaller amount of exsolving dissolved gas still being present, the density of the fluid at any given depth within the purified or fresh water portion 375 of the hydrate fractionation column 377 will be less than the density of the fluid within the manifold 378 or water down-course 380 at the same depth.

Under normal or optimal operating conditions, assuming that free gas bubbles have all migrated upward into the gas collection zone 356, any dissolved gas in the fluid in the manifold 378 will be present in an amount that is no greater than that which would be present at ambient pressures generated by the relatively shallow water column depth of the manifold, which typically will be no greater than 30–40 meters. Thus, the density of the fresh water in the manifold system 378 and along the length of the water down-course 380 will be relatively well known or capable of being modeled. That density will remain essentially the same along the length of the manifold/water down-course 380, or may increase slightly with increasing depth of water in the manifold 378 and water down-course 380, and the water will become increasingly undersaturated in dissolved gas to the extent any is present.

As illustrated, the apparatus is constructed to introduce fresh water from the water down-course 380 back into the hydrate fractionation column 377 somewhat above the hydrate stability phase boundary 373. Because the overall density of the fluid in the fresh water region 375 of the hydrate fractionation column 377 (water, hydrate, and gas) is less than the overall density of the fluid in the manifold 378/water down-course 380 (essentially fresh or purified water, with perhaps some small amount of gas), a naturally circulating system is established. The fresh or purified water in the manifold 378/water down-course 380 automatically descends and generates pressure where it is reintroduced into the hydrate fractionation column 377. This acts to force the fluid above the point of fresh water reintroduction upward, as illustrated by the downward arrow in the water down-course 380 and the upward arrows in the fresh or purified water portion 375 of the hydrate fractionation column 377. The upward velocity of fluid within the fresh water portion 375 of the hydrate fractionation column 377 supplements or is added to the upward velocity the hydrate would have had if it were rising through a static medium owing to its own buoyancy alone. Thus, the circulatory flow pattern, with the rising fresh or purified water in the portion 375 of the hydrate fractionation column 377, functions in effect as a "hydrate elevator."

The circulation-generating pressure in the system as a whole is equivalent to or a function of the difference in pressure head between the manifold 378/water down-course 380 and the hydrate fractionation column, the pressure head in the manifold 378/water down-course 380 being greater due to the greater density of the fluid contained therein. Thus, the differential in densities within the two portions of the apparatus automatically creates a circulatory flow pattern which brings the hydrate up into the upper reaches of the installation and the dissociation region 350 at a significantly faster rate, with the attendant benefits described above.

The rate at which the fluid in the fractionation column 377 rises or ascends is directly related to the rate at which fresh or purified water is reintroduced into the hydrate fractionation column 377. Where relatively little water is reintroduced, the upward flow of fluid in the hydrate fractionation column 377 will be relatively low; conversely, where fresh or purified water is reintroduced at a greater rate, significantly higher upward flow rates can be sustained within the hydrate fractionation column 377.

A given volume of produced fresh or purified water may be circulated through the system more than once. However, if the rate at which product water is reintroduced into the main hydrate fractionation column 377 is too great, such that the relative amount of hydrate within the hydrate fractionation column 377 decreases to below a certain amount or such that the rate at which the hydrate moves upward increases to the point that relatively minimal gas evolves in the fresh or purified water portion 375 of the hydrate fractionation column 377, the circulation-driving density difference between the fresh water portion 375 of the hydrate fractionation column 377 and the manifold 378/water down-course 380 will decrease and circulation will ultimately slow. Thus, there is a point at which the velocity of the circulatory system may become self-limiting for any particular amount of hydrate. The more hydrate produced, the more gas that can be generated and effused, but the overall lift is determined mainly by the amount of gas efffused in the main column 377—particularly in its lower parts.

The circulatory flow pattern may be initiated and regulated using appropriate flow-rate control devices, e.g., controllable blade-pitch pumps or thrusters 394 that are located between the fresh or purified water distribution manifold 378 and the fresh water down-course pipe 380 or by various flow constrictors (not illustrated) located along the length of the down-course 380. Under conditions of large flow rates of water, once the natural circulation system has been established and stabilized at optimal operating conditions, the difference in densities will continue to drive circulation in the system. At that point, the mechanical load produced by limiting the velocity of the circulating water in the system on the thruster/pump assembly 394 from the pressure of that circulating water can be used to generate hydroelectric power by causing the pump mechanism to rotate, akin to an automotive starter/generator. Alternatively, if the thruster/pump assembly 394 is closed, circulation through the system will stop.

Under extreme circumstances, the circulatory system can be regulated by means of the amount of gas which is removed from the hydrate dissociation region 350. In particular, if gas removal from the hydrate dissociation region 350 is significantly reduced or even terminated, pressure will begin to rise within the hydrate dissociation region 350, thus suppressing (i.e., pushing down) the gas/water interface 356 to the point that the circulation-permitting hydraulic communication or connection between the upper part of the hydrate fractionation column 377 and the manifold 378 is eliminated. At that point, the fresh or purified water in the upper portion 375 of the hydrate fractionation column 377 will become essentially static, and gas evolution will decrease because hydrate in the column 377 will remain under higher pressure for longer periods of time as it rises through the column 377.

As illustrated in FIGS. 8–10, as well as in FIG. 2, a number of different circulation-fostering embodiments are possible. For example, as illustrated in FIG. 8, the fresh or purified water is reintroduced into the hydrate fractionation column 377 through an annular injector or eductor 392, which is configured and positioned so as not to obstruct the hydrate rising through the column 377. In this embodiment, the injectors (not individually illustrated) are located primarily in the walls of the fractionation column 377. Because the injectors are spaced around the circumference of the main fractionation column 377, they each can be relatively small, but in total can inject very large volumes of water while minimizing the amount of turbulence generated at any particular water injection location. The annular injector or eductor 392 is positioned to avoid causing the seawater/brine and the fresh or purified water to become mixed. Thus, it is located at a depth that is above the level 373 (preferably the hydrate phase boundary depth) where such mixing of fresh and subjacent seawater/brine takes place, for example, on the order of 10 meters or more above that depth 373.

In another embodiment, illustrated in FIG. 9, the fresh or purified product water is reintroduced into the main fractionation column 377 by injection using a downward-directed injector pipe 395. Water 397 injected into the system from the pipe 395 is deflected upwardly by a hydrodynamically shaped deflector 399, which is depicted simply as a straight line in FIG. 9 to denote no particular shape since many different deflector configurations are possible. In practice, the deflector 399 is shaped to deflect the injected fresh or purified water upwardly with a minimum amount of turbulence being generated. This configuration is advantageous in that it reduces the number of physical elements protruding into the column 377 at a low level within the fresh water section 375. Where the water down-course 380 enters the column 377 relatively high along the length of the column, as shown, and extends downward for a considerable distance within the column 377 (for instance, for about two thirds of the distance from the fresh water reintroduction level to the top of the main fractionation column 377), the downward-extending pipe portion 395 of the water down-course 380 will have relatively little effect on the velocity of the upward-moving fluid (water and hydrate) within the portion 375 of the column 377.

In yet another embodiment, illustrated in FIG. 10, the fresh or purified water is reintroduced into the hydrate fractionation column 377 using a centrally located, upwardly facing injector 398. Although this configuration is mechanically simpler than an annular injection configuration as illustrated in FIG. 8, it introduces physical elements into the fractionation column 377 below the level where fluid within the column 377 will be subject to additional lift. Introducing physical elements such as pipes and injectors may be detrimental to the buoyant rise of the hydrate where the hydrate may be physically obstructed in its rise under the influence of its own buoyancy alone.

Although three different embodiments are illustrated in FIGS. 8–10, with the embodiment shown in FIG. 8 having no water down-pipe located within the main column 377, the embodiment illustrated in FIG. 9 having a considerable length of water down-pipe located within the main column 377, and the embodiment illustrated in FIG. 10 illustrating the entrance of the water down-course 380 into the fractionation column 377 at about the same level at which fresh or purified water is reintroduced into the column 377, the exact location or configuration of the water delivery down-pipe is not necessarily tied to or limited by the specific method by means of which fresh or purified water is reintroduced into the hydrate fractionation column 377. For example, the water delivery down-pipe (or down-pipes) may be located entirely outside of the hydrate fractionation column 377, carried within a lining of the main fractionation column 377, attached to the interior of the column 377, suspended away from the walls of the column 377, or it (they) may be configured in a combination of these configurations.

Although particular and specific embodiments of the invention have been disclosed in some detail, numerous modifications will occur to those having skill in the art, which modifications hold true to the spirit of this invention. For example, although the hydrate-elevating circulation system claimed herein has been illustrated and described in connection with in-land-shaft-based desalination, it may also be employed in connection with open-ocean marine-based systems, where the hydrate fractionation column extends, for example, from the surface of the ocean to depths where pressure and temperature conditions cause hydrate to form spontaneously when hydrate-forming gas is injected into the lower regions of the fractionation column, as illustrated, for example, in U.S. Pat. No. 5,873,262. Such modifications are deemed to be within the scope of the following claims.

What is claimed is:

1. A method of conducting hydrate-based desalination or water purification in a hydrate fractionation column, said method comprising:

introducing hydrate-forming substance into a lower, hydrate formation region of said hydrate fractionation column where saline or otherwise polluted water to be treated is present, said water to be treated being under temperature and pressure conditions sufficient for hydrate to form upon introduction of said hydrate-forming substance into said hydrate formation region, whereby positively buoyant or gas-assisted positively buoyant hydrate forms within said hydrate formation region, allowing said hydrate to rise within said hydrate fractionation column toward a hydrate dissociation region of said hydrate fractionation column, allowing said hydrate to dissociate to release fresh or purified water and said hydrate-forming substance, said fresh or purified water collecting in said upper, hydrate dissociation region of said hydrate fractionation column, and collecting fresh or purified water product water, wherein a fresh or purified water region of said hydrate fractionation column extends downwardly from said hydrate dissociation region to a level corresponding approximately to the top of a region where said hydrate is stable and a mixture of fresh or purified water, hydrate, and gaseous hydrate-forming substance is present within said fresh or purified water region of said hydrate fractionation column, said method further comprising removing a portion of said fresh or purified water from an upper region of said hydrate fractionation column and reintroducing said removed portion of fresh or purified water into said hydrate fractionation column at a lower, reintroduction region thereof, said reintroduction region being located at a lower region of said fresh or purified water region of said hydrate fractionation column and above the level corresponding to the top of said region where hydrate is stable, whereby a fluid flow circuit is established that extends from said reintroduction region of said hydrate fractionation column, up along said fresh or purified water region of said hydrate fractionation column, and down along a fresh or purified water down-flow conduit through which said removed portion of fresh or purified water flows to said reintroduction region, wherein the density of said mixture of fresh or purified water, hydrate, and gaseous hydrate-forming substance that is present in said fresh or purified water region of said hydrate fractionation column is less than the density of said removed and reintroduced portion of fresh or purified water such that a density-differential-driven circulatory system of fluid automatically rising at an enhanced rate within said fresh or purified water region of said hydrate fractionation column and flowing down along said fresh or purified water down-flow conduit is established.

2. The method of claim 1, further comprising controlling the rate of flow of said circulatory system so as to maintain a desired upward flow rate of hydrate within said fresh or purified water region of said fractionation column.

3. The method of claim 1, further comprising initiating the flow of fresh or purified water down along said fresh or purified water down-flow conduit using a pump.

4. The method of claim 3, further comprising generating electrical power as fluid automatically flows through said pump, as part of said circulatory system, due to the difference between the density of said mixture of fresh or purified water, hydrate, and gaseous hydrate-forming substance that is present in said fresh or purified water region of said hydrate fractionation column and the density of said removed portion of fresh or purified water that is in said fresh or purified water down-flow conduit.

5. The method of claim 1, wherein said portion of fresh or purified water is removed from said hydrate dissociation region.

6. The method of claim 1, wherein said portion of fresh or purified water is removed from said hydrate dissociation region via a degassification manifold that extends downwardly from said hydrate dissociation region.

7. The method of claim 6, wherein said portion of fresh or purified water is degassified in said degassification manifold.

8. The method of claim 6, wherein said fresh or purified product water is collected by being withdrawn from said degassification manifold.

9. The method of claim 1, further comprising recovering gaseous hydrate-forming substance, released upon dissociation from said hydrate, from said hydrate dissociation region of said hydrate fractionation column.

10. The method of claim 9, further comprising re-using said recovered hydrate-forming substance for further cycles of hydrate-based desalination or purification.

11. The method of any one of claims 1 and 2–10, wherein said hydrate fractionation column comprises a shaft formed in land, said hydrate formation region being formed at a lower portion of said in-land shaft, said method further comprising providing input water to be treated into said hydrate fractionation column at a location that is generally at or above the highest point within said hydrate formation region at which hydrate is formed.

12. The method of claim 11, wherein heated residual brine or other heated residue of said water to be treated is removed from a lower portion of said hydrate formation region of said hydrate fractionation column, thus removing heat of exothermic hydrate formation from said hydrate formation region.

13. The method of claim 12, further comprising pre-treating said water to be treated with hydrate-forming substance without causing hydrate to form.

14. The method of claim 11, further comprising pre-treating said water to be treated with hydrate-forming substance without causing hydrate to form.

15. The method of any one of claims 1 and 2–10, wherein the rate at which said removed portion of fresh or purified water is reintroduced into said hydrate fractionation column is controlled so as to maintain general separation between, and minimize mixing of, fresh or purified water in said fresh or purified water region of said hydrate fractionation column and seawater, residual brine, or other residual fluid below said fresh or purified water region of said hydrate fractionation column.

16. The method of claim 15, further comprising removing mixed salinity or mixed purity fluid that does result from mixing of said fresh or purified water in said fresh or purified water region of said hydrate fractionation column with said seawater, residual brine, or other residual fluid.

17. The method of claim 16, further comprising pre-treating said water to be treated with hydrate-forming substance without causing hydrate to form.

18. The method of claim 15, further comprising pre-treating said water to be treated with hydrate-forming substance without causing hydrate to form.

19. The method of any one of claims 1 and 2–10, wherein the manner in which said removed portion of fresh or purified water is reintroduced into said hydrate fractionation column is controlled so as to maintain general separation between, and minimize mixing of, fresh or purified water in said fresh or purified water region of said hydrate fractionation column and seawater, residual brine, or other residual fluid below said fresh or purified water region of said hydrate fractionation column.

20. The method of claim 19, further comprising removing mixed salinity or mixed purity fluid resulting from mixing of said fresh or purified water in said fresh or purified water region of said hydrate fractionation column and said seawater, residual brine, or other residual fluid.

21. The method of claim 20, further comprising pre-treating said water to be treated with hydrate-forming substance without causing hydrate to form.

22. The method of claim 19, further comprising pre-treating said water to be treated with hydrate-forming substance without causing hydrate to form.

23. The method of any one of claims 1 and 2–10, further comprising pre-treating said water to be treated with hydrate-forming substance without causing hydrate to form.

* * * * *